United States Patent
Coldicott et al.

(10) Patent No.: US 7,386,724 B2
(45) Date of Patent: Jun. 10, 2008

(54) ASSIGNING SECURITY LEVELS TO A SHARED COMPONENT

(75) Inventors: Peter Alan Coldicott, Lago Vista, TX (US); George M. Galambos, Montreal (CA); Raman Harishankar, Blacklick, OH (US); Kerrie Lamont Holley, Montara, CA (US); Edward Emile Kelley, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 790 days.

(21) Appl. No.: 10/870,532

(22) Filed: Jun. 17, 2004

(65) Prior Publication Data

US 2005/0283605 A1 Dec. 22, 2005

(51) Int. Cl.
*H04L 9/34* (2006.01)
(52) U.S. Cl. ..................... 713/163; 713/166
(58) Field of Classification Search ........... 713/163, 713/166
See application file for complete search history.

(56) References Cited

U.S. PATENT DOCUMENTS

| | | | |
|---|---|---|---|
| 6,173,404 B1 | 1/2001 | Colburn et al. | 713/200 |
| 6,324,646 B1 | 11/2001 | Chen et al. | 713/201 |
| 6,604,198 B1 | 8/2003 | Beckman et al. | 713/167 |
| 6,609,198 B1 | 8/2003 | Wood et al. | 713/155 |
| 6,678,826 B1 | 1/2004 | Kelly et al. | 713/201 |
| 2004/0078258 A1* | 4/2004 | Schulz et al. | 705/9 |

FOREIGN PATENT DOCUMENTS

| | | |
|---|---|---|
| EP | 0 465 016 | 11/1991 |
| EP | 0 849 680 | 6/1998 |

\* cited by examiner

*Primary Examiner*—Gilberto Barron, Jr.
*Assistant Examiner*—Venkat Perungavoor
(74) *Attorney, Agent, or Firm*—VanLeeuwen & VanLeeuwen; David A. Mims, Jr.

(57) ABSTRACT

Assigning security levels to a shared component is presented. A workflow manager receives a workflow request that corresponds to a plurality of workflow steps. For each workflow step, the workflow manager determines whether the workflow step uses a shared component or an unshared component for execution. If the workflow step uses a shared component, the workflow manager invokes the step, and stores the step and its corresponding security level in a security tracking table. When the workflow manager encounters a shared component, the workflow manager uses the security tracking table entries in order to determine a security level to assign the shared component. The workflow manager assigns the determined security level to the shared component, and invokes the shared component to execute the corresponding process step.

6 Claims, 7 Drawing Sheets

500 ⬈

| 505 ⬊ PROCESS SECURITY TABLE 510 ⬈ ||
|---|---|
| Process Name | Security Level |
| process step 1 | 4 |
| process step 2 | 1 |
| process step 3 | 2 |
| process step 4 | 5 |
| ⋮ | ⋮ |
| process step 100 | 2 |

| WORKFLOW SECURITY TABLE ||
|---|---|
| Security Level | Process Name |
| 4 | process step 32 |
| 4 | process step 7 |
| 2 | process step 28 |
| 5 | process step 23 |
| 1 | process step 44 |
| 3 | process step 72 |
| 1 | process step 41 |

*Figure 5B*

SHARED COMPONENT PROFILE

| Component Name | Transaction | User | Instance Data | Functionality |
|---|---|---|---|---|
| Component 1 | Txn1 | user 1 | $100 | Authorize Funds |
| Component 1 | Txn1 | user 2 | $200 | Authorize Funds |
| Component 1 | Txn1 | user 3 | $300 | Authorize Funds |
| Component 2 | Txn2 | user 2 | abc company access | employee serial |
| Component 2 | Txn3 | user 4 | $300 | Authorize Funds |
| Component 2 | Txn1 | user 1 | $100 | Authorize Funds |
| Component 2 | Txn4 | user 1 | $200 | Authorize Funds |

*Figure 6*

ASSIGNING SECURITY LEVELS TO A SHARED COMPONENT

BACKGROUND OF THE INVENTION

1. Technical Field

The present invention relates in general to a system and method for assigning security levels to a shared component. More particularly, the present invention relates to a system and method for using completed workflow step security levels in order to determine a shared component's security level.

2. Description of the Related Art

Large computer systems typically support multiple applications. These applications invoke "workflows" whereby a workflow is a series of process steps. For example, a computer system may support an employee directory application, and one of the application's workflows is to retrieve contact information from an employee database. Each process step uses a "component" during its execution. Using the example described above, the employee directory application may use a "database access" component during its contact information retrieval workflow.

A challenge found is when more than one application accesses a particular component. Expanding on the example described above, another one of the computer system's applications may be an employee data update application, whereby the application accesses the same employee database as the employee directory application in order to update contact information. In this example, both the employee directory application and the employee data update application share the "database access" component. The challenge found when applications share components is assigning a security level to the component. In the example described above, retrieving contact information is at a lower security level than updating contact information. However, existing art assigns the same security level to both process steps when the shared component is used, regardless of which application is invoking the shared component.

What is needed, therefore, is a system and method to allow shared components to operate at different security levels based upon a corresponding process step.

SUMMARY

It has been discovered that the aforementioned challenges are resolved by identifying a highest security level that corresponds to process steps that occur prior to invoking a shared component, and assigning the highest security level to the shared component. A workflow manager tracks workflow steps that correspond to unshared components and stores the workflow steps, along with their respective security levels, in a security tracking table. When the workflow manager encounters a shared component, the workflow manager analyzes the security tracking table in order to identify a security level to assign to the shared component.

A workflow manager receives a workflow request from an application, whereby the workflow request includes a plurality of workflow steps. Each workflow step corresponds to an unshared component or a shared component. For example, a particular component may be shared between two applications for processing a particular workflow step, such as accessing a database. The workflow manager analyzes the workflow request, and selects a first workflow step that corresponds to the workflow request. The workflow manager identifies the workflow step's corresponding component, and retrieves the identified component's profile from a storage area. The workflow manager performs "reverse access control" by comparing component authorization entries located in the component profile with security information that corresponds to the workflow request. For example, security information may correspond to a user security level or instance data (i.e. a dollar amount of a particular cash withdraw).

Once the workflow manager authorizes the workflow request, the workflow manager determines whether the identified component is shared or unshared. If the selected component is unshared, the workflow manager invokes the selected step using the unshared component. In addition, the workflow manager identifies the selected step's corresponding security level, and stores the selected step and its corresponding security level in a workflow security tracking table. The workflow manager tracks completed step security levels in order to determine a security level when it processes a shared component.

When the workflow manager encounters a workflow step that uses a shared component, the workflow manager accesses the workflow security tracking table to identify a "highest" completed step security level. For example, if the table includes five completed workflow steps, whereby four of the completed workflow steps have a corresponding security level of "three", and the fifth completed workflow step has a corresponding security level of "five," then the highest completed step security level is "five." As one skilled in the art can appreciate, different security level ranges may be used, such as "1" being the highest security level and "5" being the lowest security level.

The workflow manager assigns the highest completed step security level to the shared component, and invokes the shared component to process the corresponding step. The shared component processes the step, such as accessing data from a database, using the assigned security level. In addition, the workflow manager resets the workflow security tracking table each time it invokes a shared component in order to clear the completed steps and their corresponding security levels from the table.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings. The use of the same reference symbols in different drawings indicates similar or identical items.

FIG. 5A is a process security table that includes process steps and corresponding security levels;

FIG. 5B is a workflow security tracking table that includes completed steps and corresponding security levels;

FIG. 6 is a shared component profile table that includes entries that correspond to a shared component.

DETAILED DESCRIPTION

The following is intended to provide a detailed description of an example of the invention and should not be taken to be limiting of the invention itself. Rather, any number of variations may fall within the scope of the invention which is defined in the claims following the description.

Figure 1:
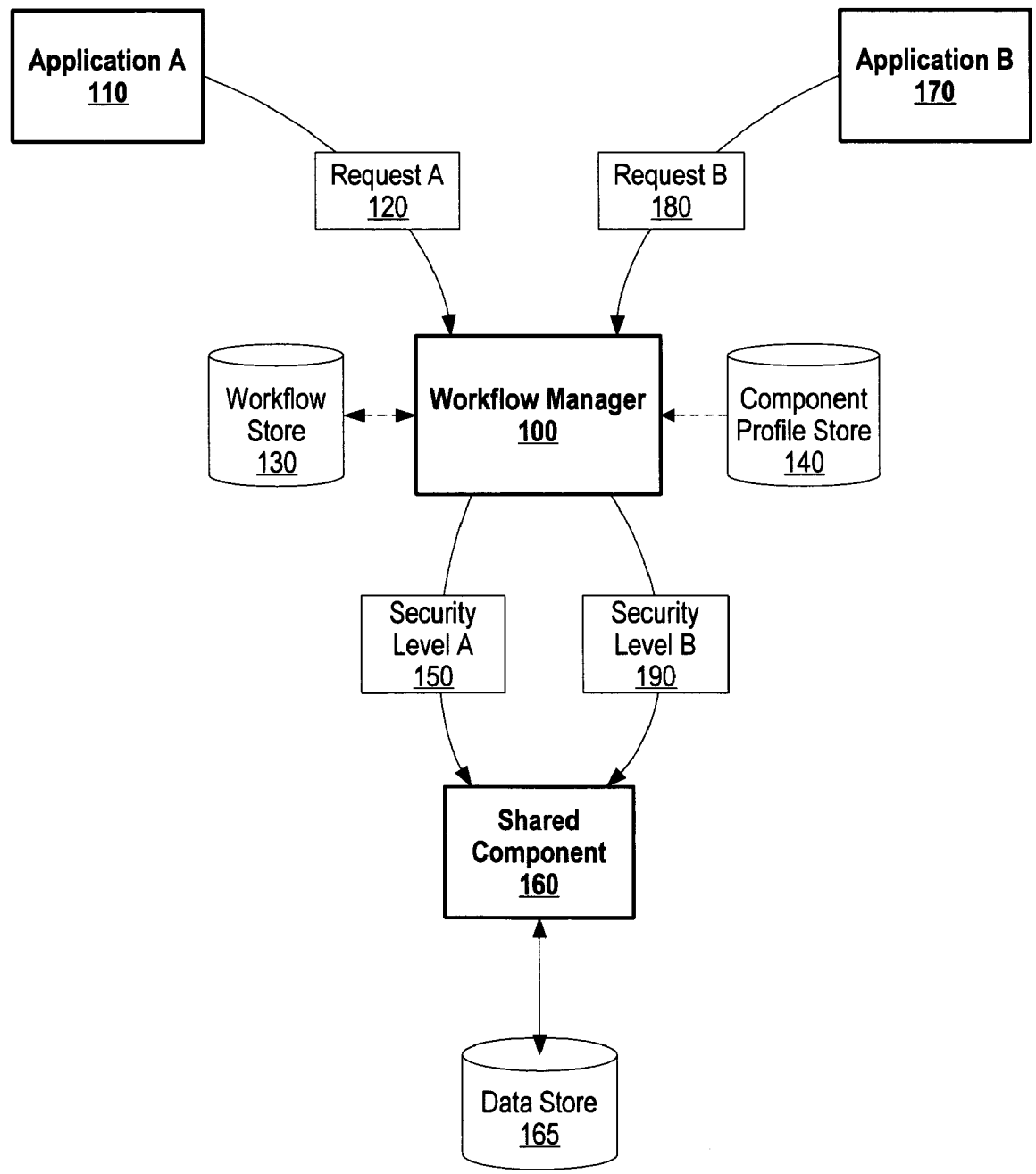
FIG. 1 is a diagram showing a workflow manager receiving workflow requests and assigning security levels to a shared component.

FIG. 1 is a diagram showing a workflow manager receiving workflow requests and assigning security levels to a shared component. A workflow request includes a plurality of workflow steps, each of which corresponding to a particular component. Some workflow steps use unshared components, while other workflow steps use shared components. For example, a particular component may be shared between two applications for processing a particular workflow step, such as accessing a database.

Application A 110 sends request 120 (i.e. workflow request) to workflow manager 100. Workflow manager 100 analyzes request 120, and selects a first workflow step that corresponds to request A 120. Workflow manager 100 identifies a component that corresponds to the selected workflow step, and retrieves the identified component's profile from component profile store 140. Workflow manager 100 performs a "reverse access control" by comparing component authorization entries located in the component profile with security information that corresponds to request A 120. For example, security information may correspond to a user security level or instance data (i.e. a dollar amount of a particular cash withdraw). Component profile store 140 may be stored on a nonvolatile storage area, such as a computer hard drive.

Once workflow manager 100 authorizes request A 120, workflow manager 100 determines whether the identified component is shared or unshared. If the selected component is unshared, workflow manager 100 invokes the selected step using the unshared component. In addition, workflow manager 100 identifies the selected step's corresponding security level, and stores the selected step and its corresponding security level in a workflow security tracking table that is located in workflow store 130. Workflow manager 100 tracks completed step security levels in order to determine a security level for shared component (see FIG. 4 and corresponding text for further details regarding shared component security level determination). Workflow store 130 may be stored on a nonvolatile storage area, such as a computer hard drive.

When workflow manager 100 encounters a workflow step that uses a shared component, such as shared component 160, workflow manager 100 accesses the workflow security tracking table to identify a highest completed step security level that is included in the table. For example, if the table includes five completed workflow steps, and four of the completed workflow steps have a corresponding security level of "three", and the fifth completed workflow step has a corresponding security level of "five," then the highest completed step security level is "five." As one skilled in the art can appreciate, different security level ranges may be used, such as "1" being the highest security level and "5" being the lowest security level (see FIG. 5B and corresponding text for further details regarding workflow security tracking table properties).

Workflow manager assigns the highest completed step security level (e.g. security level A 150) to shared component 160, and invokes shared component 160 to process the corresponding step. Shared component 160 processes the step, such as accessing data from data store 165 or storing data on data store 165. In addition, workflow manager 100 resets the workflow security tracking table each time it invokes a shared component in order to clear the completed steps and their corresponding security levels from the table.

Workflow manager 100 receives requests to access shared component 160 from other applications, such as application B 170. Workflow manager 100 receives request 180, and, when it encounters a process step that corresponds to shared component 160, workflow manager accesses the workflow security tracking table, identifies a highest completed step security level, and assigns the highest completed step security level that corresponds to request B 180 to shared component 160 (e.g. security level B 190).

Figure 2:
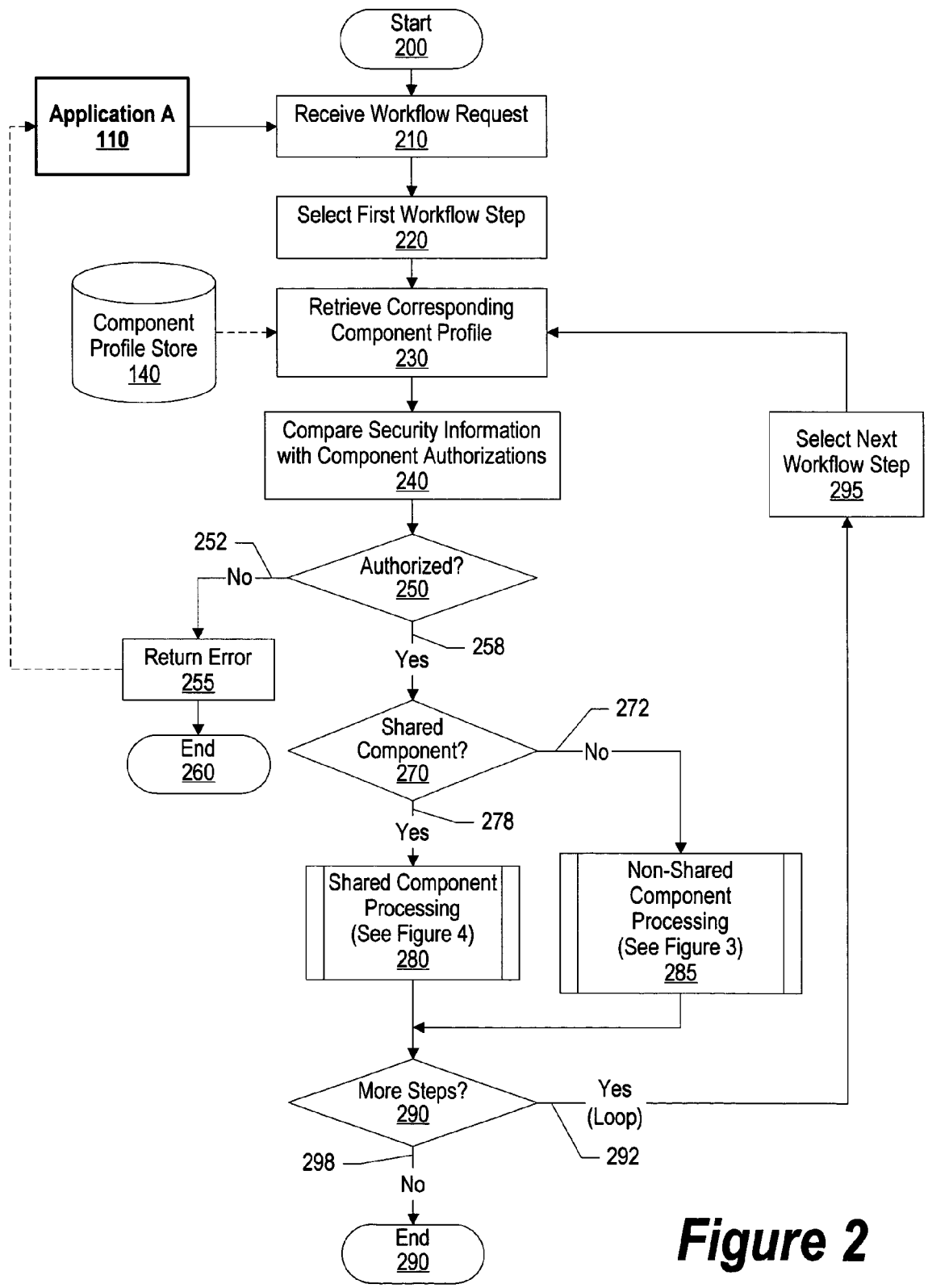
FIG. 2 is a high-level flowchart showing steps taken in processing a workflow request.

FIG. 2 is a high-level flowchart showing steps taken in processing a workflow request. Processing commences at 200, whereupon processing receives a workflow request from application A 110 at step 210. A workflow request includes one or more workflow steps, each of which corresponding to a component. Application A 110 is the same as that shown in FIG. 1.

Processing selects the first workflow step included in the workflow request at step 220. At step 230, processing retrieves a component profile from component profile store 140 that corresponds to the selected workflow step. For example, the selected workflow step may correspond to a component "D" and, in this example, processing retrieves a component profile that corresponds to component "D". The component profile includes authorization entries such as users that are authorized to use the component and may include levels of authorization (see FIG. 6 and corresponding text for further details regarding component profile attributes. Component profile store 140 is the same as that shown in FIG. 1 and may be stored on a nonvolatile storage area, such as a computer hard drive.

Processing compares security information with the authorization entries located in the component profile at step 240. The security information may include a user security level, instance data, or a database entry. A determination is made as to whether the security information matches one of the authorization entries (decision 250). If the security information does not match one of the authorization entries, decision 250 branches to "No" branch 255 whereupon processing returns an error (step 255) and ends at 260.

On the other hand, if the security information matches one of the authorization entries, decision 250 branches to "Yes" branch 258 whereupon a determination is made as to whether the component is shared (decision 270). For example, multiple applications may access a particular component, in which the component is "shared" between the applications. If the component is shared, decision 270 branches to "Yes" branch 278 whereupon processing determines a security level to assign to the shared component, and processes the shared component with the determined security level (pre-defined process block 280, see FIG. 4 and corresponding text for further details). On the other hand, if the component is not shared, decision 270 branches to "No" branch 272 whereupon processing uses the unshared component to execute a particular process step and store the process step's corresponding security level in a workflow security tracking table (pre-defined process block 285, see FIG. 3 and corresponding text for further details).

A determination is made as to whether there more steps in the workflow request to process (decision 290). If there are more steps to process, decision 290 branches to "Yes" branch 292 which loops back to select (step 295) and process the next workflow step. This looping continues until there are no more steps to process, at which point decision 290 branches to "No" branch 298 whereupon processing ends at 299.

Figure 3:
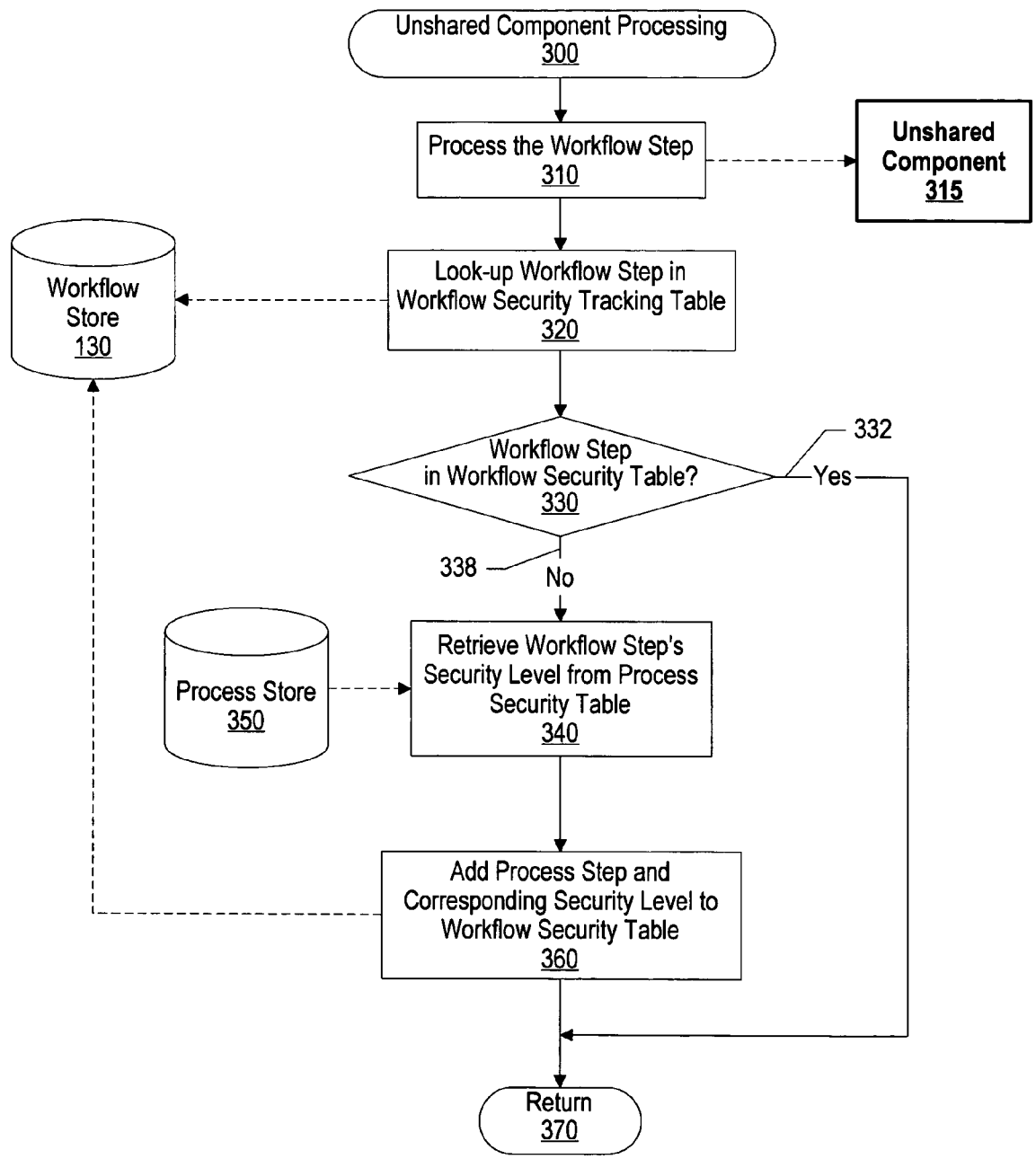
FIG. 3 is a detail level flowchart showing steps taken in processing a workflow step that corresponds to an unshared component.

FIG. 3 is a detail level flowchart showing steps taken in a workflow manager processing a workflow step that corresponds to an unshared component. Workflow manager processing commences at 300, whereupon the workflow manager uses unshared component 315 to process a workflow step (step 310). At step 320, the workflow manager looks-up the workflow step in a workflow security tracking table located in workflow store 130. The workflow manager uses the workflow security tracking table to track completed step security levels that correspond to completed workflow steps. The workflow manager uses the completed step security levels in the process of determining a security level to assign to a shared component (see FIG. 4 and corresponding text for further details regarding shared component security level determination steps). Workflow store 130 is the same as that shown in FIG. 1 and may be stored on a nonvolatile storage area, such as a computer hard drive.

A determination is made as to whether the completed workflow step has been stored in the workflow security tracking table (decision 330). If the completed workflow step is stored in the workflow security tracking table, decision 330 branches to "Yes" branch 332 bypassing workflow step storage. On the other hand, if the completed workflow step is not located in the workflow step security table, decision 330 branches to "No" branch 338 whereupon processing retrieves a security level that corresponds to the completed workflow step from a process security table located in process store 350. The process security table includes an entry for each process step and its corresponding security level (see FIG. 5A and corresponding text for further details regarding process security table properties). Process store may be stored on a nonvolatile storage area, such as a computer hard drive.

Processing stores the completed step, along with its completed step security level in the workflow security tracking table at step 360, and processing returns at 370.

Figure 4:
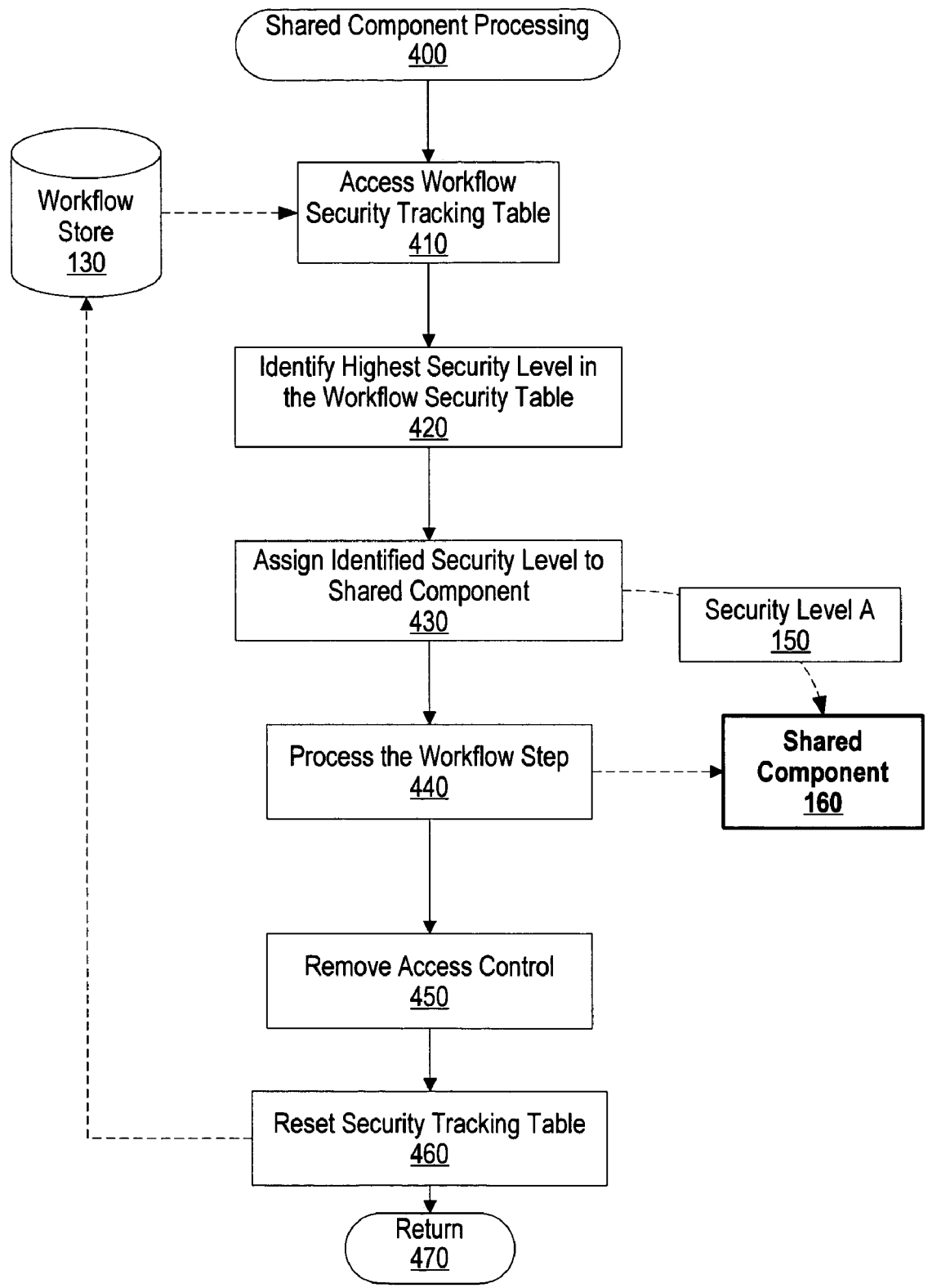
FIG. 4 is a detail level flowchart showing steps taken in processing a workflow step that corresponds to a shared component.

FIG. 4 is a detail level flowchart showing steps taken in processing a workflow step that corresponds to a shared component. Workflow manager processing commences at 400, whereupon processing accesses a workflow security tracking table that is located in workflow store 130 (step 410). The workflow security tracking table includes a list of completed workflows steps with corresponding completed step security levels that occurred between shared component steps (see FIG. 5B and corresponding text for further details regarding workflow security tracking table properties). Workflow store 130 is the same as that shown in FIG. 1 and may be stored on a nonvolatile storage area, such as a computer hard drive.

Processing identifies a highest completed step security level that is included in the workflow security tracking table at step 420. For example, if the table includes five completed workflow steps, and four of the completed workflow steps have a corresponding security level of "three", and the fifth completed workflow step has a corresponding security level of "five," then the highest completed step security level is "five." Processing assigns the highest identified completed step security level, such as security level A 150, to shared component 160 at step 430.

At step 440, the workflow manager invokes shared component 160 to execute the process step using security level A 150. Using the example described above, the shared component executes the process step using a security level "five." At step 450, processing removes access control to the shared component. The workflow manager resets (i.e. clears) the workflow security tracking table at step 460, and returns at 470.

FIG. 5A is a process security table that includes process steps and corresponding security levels. A workflow manager accesses table 500, and identifies a particular unshared process step's corresponding security level. Table 500 includes a list of process steps (column 505) and corresponding security levels (column 510) in which a workflow manager uses to process workflow requests (see FIG. 3 and corresponding text for further details regarding unshared component security level correlation steps).

Lines 515 through 535 include process steps and corresponding security levels. Line 515 shows that process step 1 has a corresponding security level of "4". Line 520 shows that process step 2 has a corresponding security level of "1". Line 525 shows that process step 3 has a corresponding security level of "2". Line 530 shows that process step 4 has a corresponding security level of "5". Finally, line 535 shows that process step 100 has a corresponding security level of "2". When the workflow manager identifies a security level that corresponds to an unshared component workflow step, the workflow manager stores the step, along with its corresponding security level, in a workflow security tracking table (see FIG. 5B and corresponding text for further details regarding workflow security tracking table properties).

FIG. 5B is a workflow security tracking table that includes completed steps and corresponding security levels. A workflow manager adds entries to table 550 when it processes unshared component workflow steps (see FIG. 3 and corresponding text for further details regarding table entries). When a workflow manager encounters a shared component process step, the workflow manager reviews the table entries in table 550, and selects the highest security level included in table 550 to assign to the shared component (see FIG. 4 and corresponding text for further details regarding shared component security assignment steps).

Table 550 includes completed step security levels (column 555) and corresponding completed steps (column 560). Lines 565 through 595 include entries that the workflow manager stores when the workflow manager processes unshared component workflow steps. Line 565 shows that completed step "32" has a completed step security level of "4". Line 570 shows that completed step "7" has a completed step security level of "4". Line 575 shows that completed step "28" has a completed step security level of "2". Line 580 shows that completed step "23" has a completed step security level of "5". Line 585 shows that completed step "44" has a completed step security level of "1". Line 590 shows that completed step "72" has a completed step security level of "3". Line 595 shows that completed step "41" has a completed step security level of "1".

The example in FIG. 5B shows that process step 23 has the highest security level, which is "5". As one skilled in the art can appreciate, different security level ranges may be used, such as "1" being the highest security level and "5" being the lowest security level.

FIG. 6 is a shared component profile table that includes entries that correspond to a shared component. Table 600 includes a list of component authorization entries that identifies authorized transaction-user-instance data-functionality combinations corresponding to a particular component. During workflow step processing, a workflow manager accesses table 600 to verify a requestor's authorization (see FIG. 2 and corresponding text for further details regarding request authorization).

Table 600 includes columns 610 through 650. Column 610 includes a list of component names that access the shared component. Column 620 includes a list of transactions, while column 630 includes a list of corresponding users. Column 640 includes a list of instance data that corresponds to the users and column 650 includes a list of corresponding functionality.

Lines 655 through 685 show various component authorization entries. For example, line 655 includes an entry for component 1 with a transaction "Txn1", a user "user 1", with instance data "$100", and a functionality to "authorize funds." In this example, line 655 informs a workflow manager that "user 1" is authorized to withdraw up to $100 from an account, such a banking account.

Figure 7:
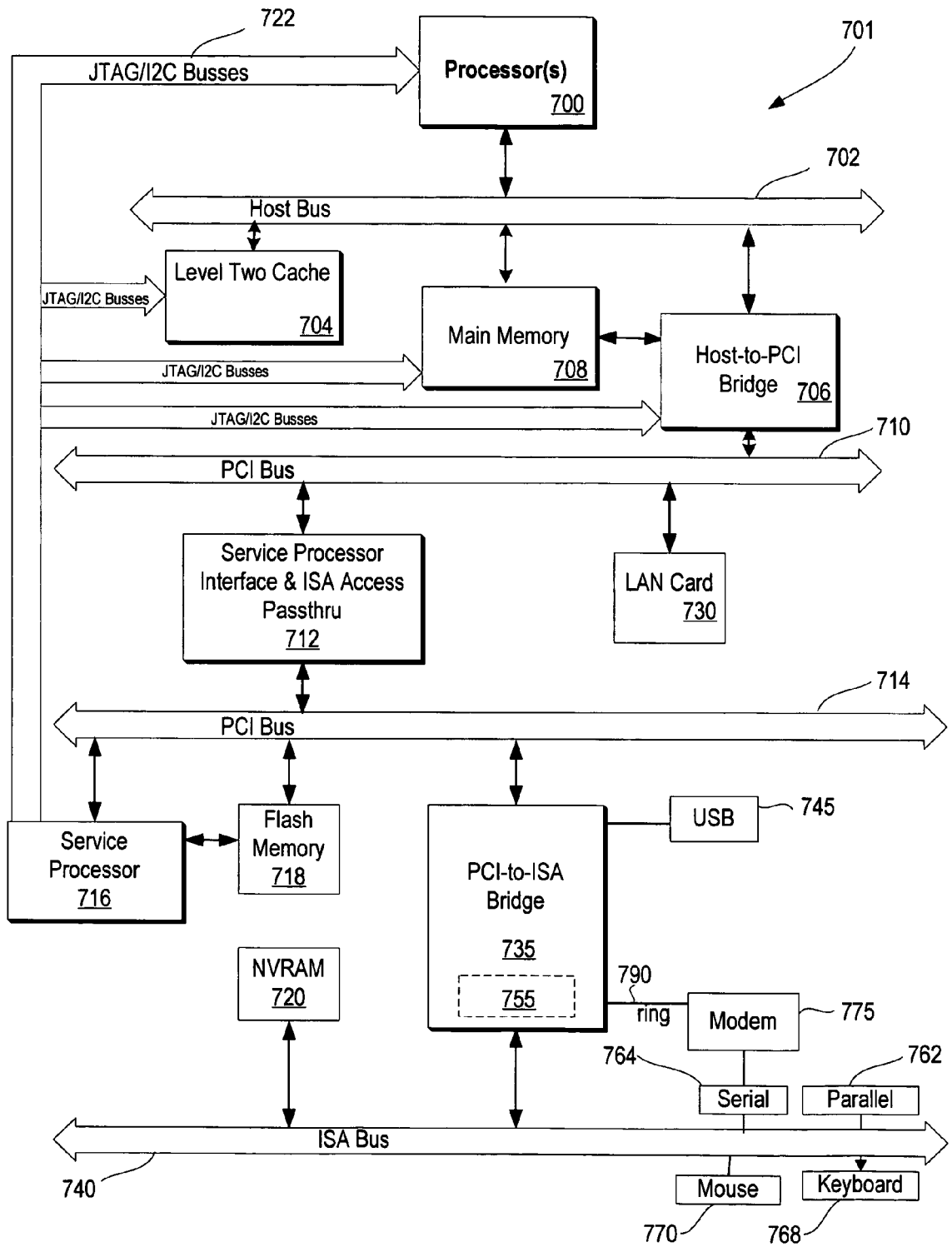
FIG. 7 is a block diagram of an information handling system capable of implementing the present invention.

FIG. 7 illustrates information handling system 701 which is a simplified example of a computer system capable of performing the computing operations described herein. Computer system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling device 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

While the computer system described in FIG. 7 is capable of executing the processes described herein, this computer system is simply one example of a computer system. Those skilled in the art will appreciate that many other computer system designs are capable of performing the processes described herein.

One of the preferred implementations of the invention is an application, namely, a set of instructions (program code) in a code module which may, for example, be resident in the random access memory of the computer. Until required by the computer, the set of instructions may be stored in another computer memory, for example, on a hard disk drive, or in removable storage such as an optical disk (for eventual use in a CD ROM) or floppy disk (for eventual uses in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For a non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer implemented method comprising:
   receiving a workflow request, the workflow request corresponding to a plurality of workflow steps;
   selecting a first workflow step included in the plurality of workflow steps;
   determining that the first workflow step does not correspond with a shared component;

in response to determining that the first workflow step does not correspond with the shared component, identifying a first security level to associate with the first workflow step;

processing the first workflow step, wherein the processing includes storing the first security level as a first completed step security level in a workflow security tracking table;

selecting a second workflow step from the plurality of workflow steps;

determining that the second workflow step corresponds with a shared component;

in response to determining that the second workflow step corresponds with the shared component, retrieving the first completed step security level from the workflow security tracking table; and assigning the first completed step security level to the shared component as a shared component security level.

2. The method of claim further comprising:

accessing the workflow security tracking table, the workflow security tracking table including a plurality of completed steps and a plurality of corresponding completed step security levels;

identifying a highest completed step security level from the plurality of completed step security levels; and assigning the identified highest completed step security level to the shared component security level.

3. The method of claim 1 further comprising:

retrieving a component profile, the component profile including one or more component authorization entries;

comparing security information with the component authorization entries, the security information corresponding to the workflow request; and sending an error message in response to not matching the security information with one of the component authorization entries during the comparing.

4. The method of claim 3 wherein the security information is selected from the group consisting of a user security level, instance data, and a database entry.

5. The method of claim 1 further comprising:

receiving a subsequent workflow request, wherein the subsequent workflow request includes a subsequent workflow step that corresponds to the shared component;

determining a subsequent shared security level based upon the subsequent workflow request, the subsequent shared security level being different than the shared security level; and assigning the subsequent shared security level to the shared component.

6. The method of claim 1 further comprising:

processing the second workflow step using the shared component which is at the shared component security level.

* * * * *